US012468240B2

(12) United States Patent
Sato

(10) Patent No.: US 12,468,240 B2
(45) Date of Patent: Nov. 11, 2025

(54) IMAGE FORMING APPARATUS HAVING TONER SUPPLY UNIT TO SUPPLY TONER TO DEVELOPING UNIT

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/438,940

(22) Filed: Feb. 12, 2024

(65) Prior Publication Data

US 2024/0184229 A1 Jun. 6, 2024

Related U.S. Application Data

(63) Continuation of application No. 18/162,877, filed on Feb. 1, 2023, now Pat. No. 11,953,844, which is a (Continued)

(30) Foreign Application Priority Data

Sep. 28, 2017 (JP) ................................ 2017-188019

(51) Int. Cl.
*G03G 15/08* (2006.01)

(52) U.S. Cl.
CPC ..... *G03G 15/0865* (2013.01); *G03G 15/0889* (2013.01); *G03G 2215/00987* (2013.01); *G03G 2215/0692* (2013.01)

(58) Field of Classification Search
CPC ........... G03G 15/0865; G03G 15/0889; G03G 2215/00987; G03G 2215/0692
See application file for complete search history.

(56) References Cited

U.S. PATENT DOCUMENTS

| | | |
|---|---|---|
| 3,954,331 A | 5/1976 | Smith |
| 4,465,112 A | 8/1984 | Kopp |

(Continued)

FOREIGN PATENT DOCUMENTS

| | | |
|---|---|---|
| JP | 57-201559 U | 12/1982 |
| JP | 59-105663 A | 6/1984 |

(Continued)

OTHER PUBLICATIONS

Office Action issued in corresponding Japanese Patent Application No. 2017-188019, Jul. 27, 2021.

(Continued)

*Primary Examiner* — Walter L Lindsay, Jr.
*Assistant Examiner* — Milton Gonzalez
(74) *Attorney, Agent, or Firm* — Merchant & Gould P.C.

(57) ABSTRACT

The present disclosure features an image forming apparatus having a first developing unit having a first developing roller; and a first toner supply unit configured to supply toner to the first developing unit, the first toner supply having: a first container configured to accommodate the toner therein, the first container having a first inlet opening through which the toner is received in the first container and a first outlet opening through which the toner in the first container is discharged; a first lid configured to close the first inlet opening; and a first shutter configured to open the first outlet opening when the first lid closes the first inlet opening, and to close the first outlet opening when the first lid opens the first inlet opening.

8 Claims, 10 Drawing Sheets

Related U.S. Application Data continuation of application No. 17/181,056, filed on Feb. 22, 2021, now Pat. No. 11,586,126, which is a continuation of application No. 16/692,045, filed on Nov. 22, 2019, now Pat. No. 10,928,749, which is a continuation of application No. 16/284,721, filed on Feb. 25, 2019, now Pat. No. 10,514,630, which is a continuation of application No. 15/918,350, filed on Mar. 12, 2018, now Pat. No. 10,241,440.

(56) References Cited

U.S. PATENT DOCUMENTS

| | | | | | |
|---|---|---|---|---|---|
| 4,489,765 | A | | 12/1984 | Yamada et al. | |
| 4,752,807 | A | | 6/1988 | Mort | |
| 4,942,432 | A | | 7/1990 | Mort et al. | |
| 5,045,884 | A | * | 9/1991 | Ohira | G03G 15/0856 399/81 |
| 5,075,727 | A | | 12/1991 | Nakatomi | |
| 5,105,218 | A | | 4/1992 | Ikeda et al. | |
| 5,150,162 | A | * | 9/1992 | Saito | G03G 15/0877 399/223 |
| 5,200,781 | A | | 4/1993 | Hata | |
| 5,202,728 | A | | 4/1993 | Maeshima et al. | |
| 5,436,707 | A | | 7/1995 | Ogane et al. | |
| 5,579,086 | A | * | 11/1996 | Ikunami | G03G 21/1864 399/112 |
| 5,648,840 | A | * | 7/1997 | Ikunami | G03G 15/0126 399/119 |
| 5,722,020 | A | * | 2/1998 | Matsuoka | G03G 15/0126 222/DIG. 1 |
| 5,758,232 | A | * | 5/1998 | Ikunami | G03G 21/1821 399/113 |
| 6,070,035 | A | | 5/2000 | Fujita et al. | |
| 7,742,724 | B2 | | 6/2010 | Tazawa et al. | |
| 8,045,886 | B2 | | 10/2011 | Sato | |
| 8,385,772 | B2 | | 2/2013 | Yoon et al. | |
| 8,712,295 | B2 | | 4/2014 | Itabashi | |
| 8,913,919 | B2 | | 12/2014 | Sato | |
| 2001/0008592 | A1 | | 7/2001 | Harris et al. | |
| 2003/0215267 | A1 | | 11/2003 | Kita | |
| 2012/0033996 | A1 | | 2/2012 | Takehara et al. | |
| 2017/0219960 | A1 | | 8/2017 | Sato | |

FOREIGN PATENT DOCUMENTS

| | | | |
|---|---|---|---|
| JP | 60151671 | A | 8/1985 |
| JP | 61-182064 | A | 8/1986 |
| JP | 3-184072 | A | 8/1991 |
| JP | 04070877 | A | 3/1992 |
| JP | 8-123171 | A | 5/1996 |
| JP | 11-157697 | A | 6/1999 |
| JP | 2001-228695 | A | 8/2001 |
| JP | 2002006606 | A | 1/2002 |
| JP | 2005-309473 | A | 11/2005 |
| JP | 2006-171072 | A | 6/2006 |
| JP | 2009-103937 | A | 5/2009 |
| JP | 2010-266754 | A | 11/2010 |
| JP | 2012-037559 | A | 2/2012 |
| JP | 2012-71585 | A | 4/2012 |
| JP | 2017-138388 | A | 8/2017 |

OTHER PUBLICATIONS

Office Action issued in corresponding Japanese Patent Application No. 2022-000616, Nov. 29, 2022.

Office Action issued in related Japanese Patent Application No. 2022-000616, Mar. 28, 2023.

* cited by examiner

IMAGE FORMING APPARATUS HAVING TONER SUPPLY UNIT TO SUPPLY TONER TO DEVELOPING UNIT

CROSS REFERENCE TO RELATED APPLICATION

This application is a continuation of U.S. patent application Ser. No. 18/162,877 filed Feb. 1, 2023, now U.S. Pat. No. 11,953,844, which is a continuation U.S. application Ser. No. 17/181,056, filed Feb. 22, 2021, now U.S. Pat. No. 11,586,126, which is a continuation of U.S. application Ser. No. 16/692,045, filed Nov. 22, 2019, now U.S. Pat. No. 10,928,749, which is a continuation of U.S. application Ser. No. 16/284,721, filed Feb. 25, 2019, now U.S. Pat. No. 10,514,630, which is a continuation of U.S. application Ser. No. 15/918,350 filed Mar. 12, 2018, now U.S. Pat. No. 10,241,440, which further claim priority from Japanese Patent Application No. 2017-188019 filed Sep. 28, 2017. The entire contents of these applications are incorporated herein by reference in their entirety.

TECHNICAL FIELD

The present disclosure relates to an image forming apparatus.

BACKGROUND

Such a conventional inkjet type image forming apparatus is known that includes an inkjet head and an ink tank. The inkjet head is configured to eject ink. The ink tank can accommodate ink to be supplied to the inkjet head.

The ink tank is directly supplied with ink externally of the image forming apparatus. With such a tank-supply style image forming apparatus, a running cost can be reduced, compared with a cartridge type image forming apparatus in which ink is supplied by exchanging a cartridge accommodating ink.

The present disclosure has been developed further from the above described conventional technique.

An object of the present disclosure is to provide an electrophotographic type image forming apparatus with an ink tank.

SUMMARY

The present disclosure features an image forming apparatus having a first developing unit having a first developing roller; and a first toner supply unit configured to supply toner to the first developing unit, the first toner supply unit having: a first container configured to accommodate the toner therein, the first container having a first inlet opening through which the toner is received in the first container and a first outlet opening through which the toner in the first container is discharged; a first lid configured to close the first inlet opening; and a first shutter configured to open the first outlet opening when the first lid closes the first inlet opening, and to close the first outlet opening when the first lid opens the first inlet opening.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

1. Outline of Image Forming Apparatus 1

The outline of an image forming apparatus 1 will now be described herein with reference to FIGS. 1 to 3.

Figure 1:
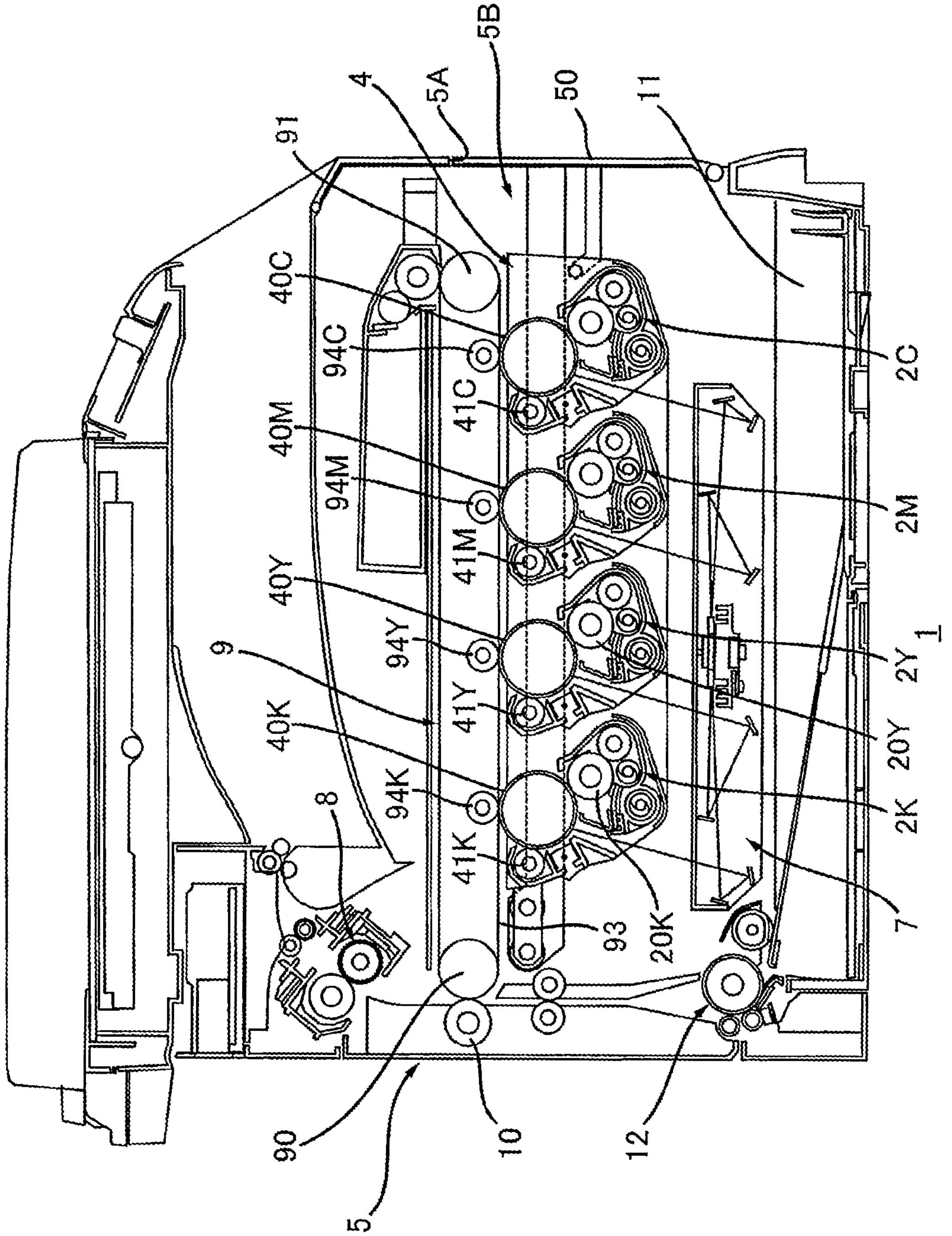
FIG. 1 is a central cross-sectional view of an image forming apparatus according to the present disclosure.
Figure 2:
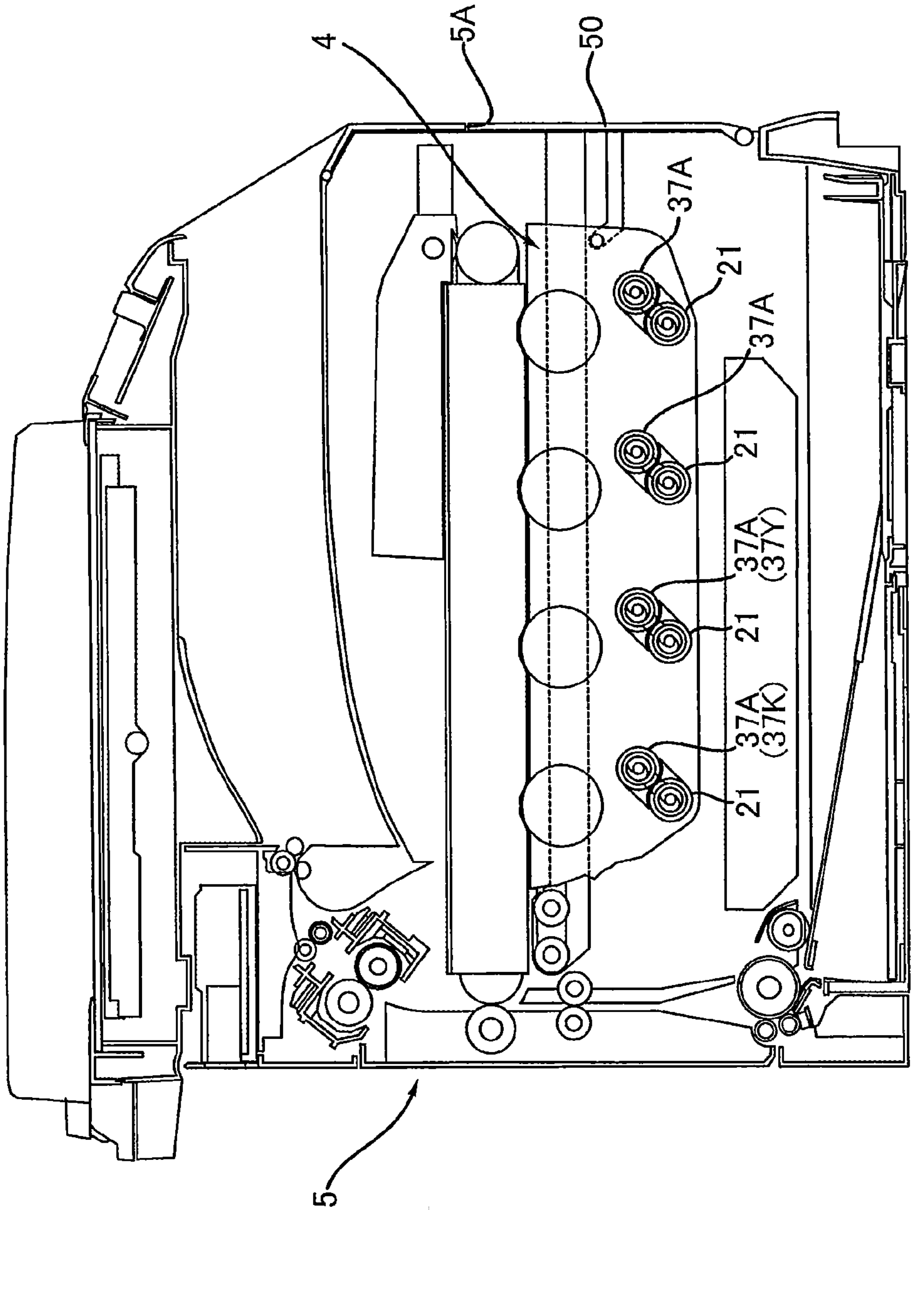
FIG. 2 is a cross-sectional view of the image forming apparatus shown in FIG. 1, and illustrating a process unit positioned at an attached position.

As illustrated in FIG. 1, the image forming apparatus 1 includes a main casing 5, a process unit 4, a laser scan unit 7, a belt unit 9, a secondary transfer roller 10, a fixing unit 8, a paper feed tray 11, and a paper feed unit 12.

1.1 Main Casing 5

The main casing 5 configures an exterior of the image forming apparatus 1. The main casing 5 has a first opening 5A, a first interior space 5B, and a first cover 50. The first opening 5A is used when the process unit 4 is attached to the main casing 5. The first interior space 5B is in communication with the first opening 5A. The process unit 4, the laser scan unit 7, the belt unit 9, the secondary transfer roller 10, the fixing unit 8, the paper feed tray 11, and the paper feed unit 12 are accommodated in the first interior space 5B.

The first cover 50 is rotatable between an open position (see FIG. 3) and a closed position. At the open position, the first opening 5A is open. At the closed position, the first opening 5A is closed. The first cover 50 is rotatable about an axis extending in a first direction. The first direction refers to the direction in which a first developing unit 2K (described later) and a first toner supply unit 3K (described later) are arranged (see FIG. 5).

1.2 Process Unit 4

Figure 3:
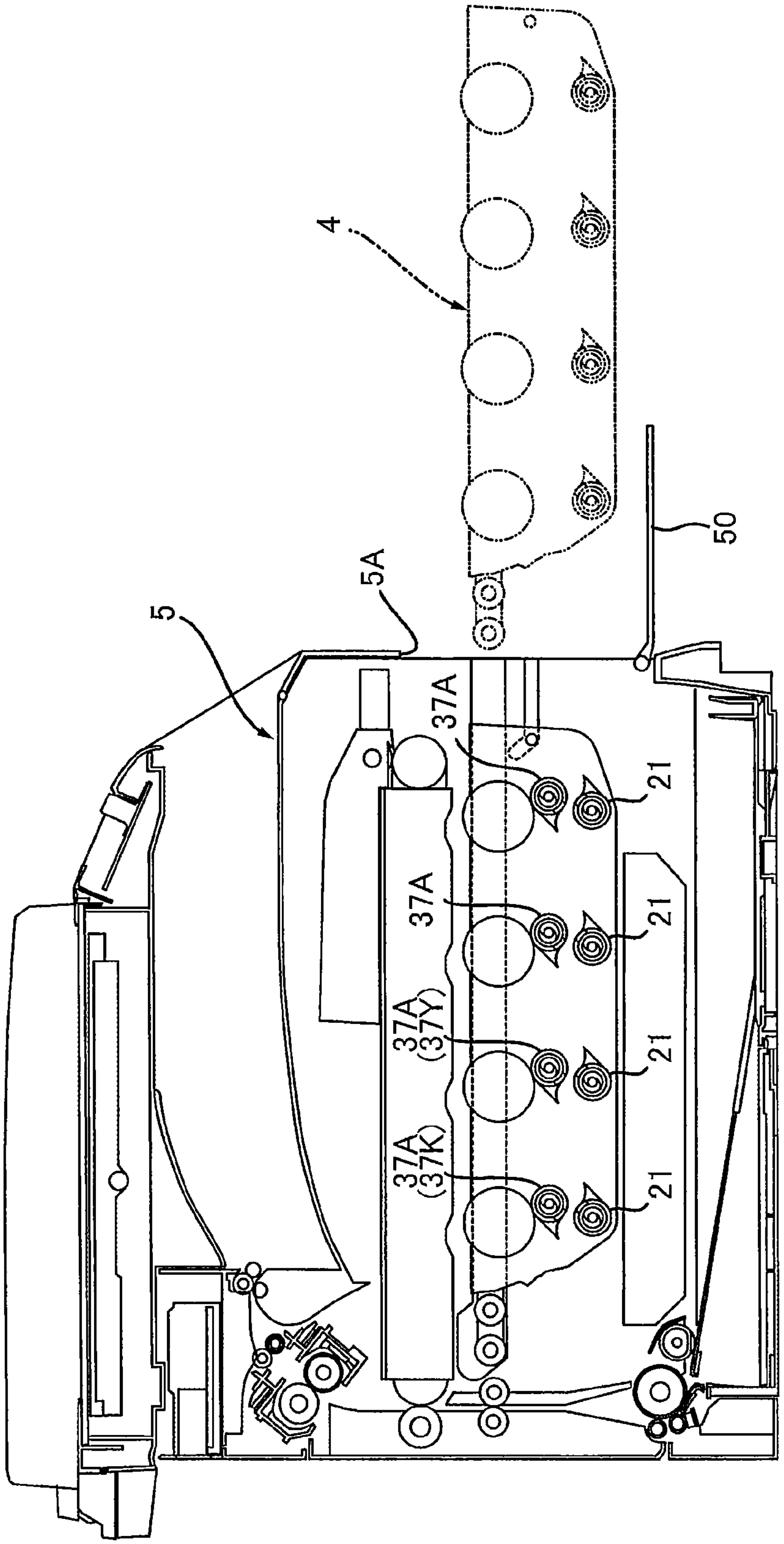
FIG. 3 is a cross-sectional view of the image forming apparatus shown in FIG. 1, and illustrating the process unit positioned at a withdrawn position.

The process unit 4 is movable through the first opening 5A between an attached position (see FIG. 2) and a withdrawn position (see FIG. 3). At the attached position, the process unit 4 is positioned inside the main casing 5. At the withdrawn position, the process unit 4 is positioned outside the main casing 5. The process unit 4 includes a plurality of photosensitive drums 40K, 40Y, 40M, and 40C, a plurality of charging rollers 41K, 41Y, 41M, and 41C, and a plurality of developing units 2K, 2Y, 2M, and 2C.

The plurality of photosensitive drums 40K, 40Y, 40M, and 40C are respectively configured to form a toner image on respective surfaces. The plurality of photosensitive drums 40K, 40Y, 40M, and 40C are arranged at intervals in a predetermined direction. The direction in which the plurality of photosensitive drums is arranged is identical to the direction in which a plurality of toner supply units 3 (described later) is arranged. The direction in which the plurality of photosensitive drums is arranged is also identical to a direction in which a rotation axis of a first agitator 33K (described later) extends. The direction in which the photosensitive drums are arranged crosses both a vertical direction and the first direction. Preferably, the direction in which the photosensitive drums are arranged be orthogonal to both the vertical direction and the first direction.

The plurality of photosensitive drums 40K, 40Y, 40M, and 40C have the same configuration as each other. Therefore, the following descriptions describe the photosensitive drum 40K, and the detailed descriptions of the photosensitive drums 40Y, 40M, and 40C are omitted. The photosensitive drum 40K is rotatable about an axis extending in the first direction.

The plurality of charging rollers 41K, 41Y, 41M, and 41C are configured to charge surfaces of the respective corresponding photosensitive drums 40. The plurality of charging rollers 41K, 41Y, 41M, and 41C have the same configurations to each other. Therefore, the following descriptions describe the charging roller 41K, and the detailed descriptions of the charging rollers 41Y, 41M, and 41C are omitted. The charging roller 41K is in contact with a peripheral surface of the corresponding photosensitive drum 40K.

The plurality of developing units 2K, 2Y, 2M, and 2C are configured to supply toner to the corresponding photosensitive drums 40. The plurality of developing units 2K, 2Y, 2M, and 2C are arranged at intervals in the direction in which the photosensitive drums are arranged. Specifically, the plurality of developing units 2K, 2Y, 2M, and 2C includes the first developing unit 2K, the second developing unit 2Y, the third developing unit 2M, and the fourth developing unit 2C. In other words, the image forming apparatus 1 includes the first developing unit 2K, the second developing unit 2Y, the third developing unit 2M, and the fourth developing unit 2C. The first developing unit 2K corresponds to the photosensitive drum 40K. The first developing unit 2K includes a first developing roller 20K. The first developing roller 20K is rotatable about the rotation axis extending in the first direction. The first developing roller 20K is in contact with the peripheral surface of the corresponding photosensitive drum 40K.

The second developing unit 2Y is arranged adjacent to the first developing unit 2K in the direction in which the developing units are arranged. The second developing unit 2Y has the same configuration as the configuration of the first developing unit 2K. In other words, the second developing unit 2Y includes the second developing roller 20Y having the same configuration as the configuration of the first developing roller 20K. The second developing roller 20Y is in contact with a peripheral surface of the corresponding photosensitive drum 40Y.

The third developing unit 2M is positioned on the opposite side to the first developing unit 2K with respect to the second developing unit 2Y. The fourth developing unit 2C is positioned on the opposite side to the second developing unit 2Y with respect to the third developing unit 2M. The third and fourth developing units 2M and 2C have the same configurations as the configuration of the first developing unit 2K.

1.3 Laser Scan Unit 7

The laser scan unit 7 is configured to expose onto the plurality of photosensitive drums 40K, 40Y, 40M, and 40C.

1.4 Belt Unit 9 and Secondary Transfer Roller 10

The belt unit 9 is configured to transfer toner images from the plurality of photosensitive drums 40K, 40Y, 40M, and 40C. The belt unit 9 is positioned on the opposite side to the laser scan unit 7 with respect to the process unit 4 located at the attached position. The belt unit 9 includes a first roller 90, a second roller 91, an intermediate transfer belt 93, and a plurality of primary transfer rollers 94K, 94Y, 94M, and 94C.

The first and second rollers 90 and 91 are disposed at an interval in the direction in which the photosensitive drums are arranged. The intermediate transfer belt 93 is an endless belt. The intermediate transfer belt 93 is stretched over the first and second rollers 90 and 91. The intermediate transfer belt 93 is movable around the first and second rollers 90 and 91. The intermediate transfer belt 93 is in contact with the plurality of photosensitive drums 40K, 40Y, 40M, and 40C.

The plurality of primary transfer rollers 94K, 94Y, 94M, and 94C are configured to transfer toner images from the respective corresponding photosensitive drums 40 to the intermediate transfer belt 93. The plurality of primary transfer rollers 94K, 94Y, 94M, and 94C are surrounded by the intermediate transfer belt 93. Between the first and second rollers 90 and 91, the plurality of primary transfer rollers 94K, 94Y, 94M, and 94C are arranged at intervals in the direction in which the photosensitive drums are arranged. The plurality of primary transfer rollers 94K, 94Y, 94M, and 94C has the same configuration as each other. Therefore, the following description is made for the primary transfer roller 94K, and the detailed description of the primary transfer rollers 94Y, 94M, and 94C is omitted.

The primary transfer roller 94K is disposed on the opposite side to the photosensitive drum 40K with respect to the intermediate transfer belt 93. The secondary transfer roller 10 is configured to transfer the toner images transferred on the intermediate transfer belt 93, onto a sheet. The secondary transfer roller 10 and the first roller 90 are arranged in the direction in which the photosensitive drums are arranged. The secondary transfer roller 10 is in contact with the intermediate transfer belt 93. The intermediate transfer belt 93 runs between the secondary transfer roller 10 and the first roller 90.

1.5 Fixing Unit 8

The fixing unit 8 is configured to heat and press the sheet on which a toner image is transferred to fix the toner image on the sheet. The fixing unit 8 is positioned above the secondary transfer roller 10.

1.6 Paper Feed Tray 11 and Paper Feed Unit 12

The paper feed tray 11 is configured to accommodate sheets. The paper feed tray 11 is positioned on the opposite side to the process unit 4 with respect to the laser scan unit 7. The paper feed unit 12 is configured to supply the sheet accommodated in the paper feed tray 11 to the gap between the first roller 90 and the secondary transfer roller 10.

2. Details of Main Casing 5

Figure 4:
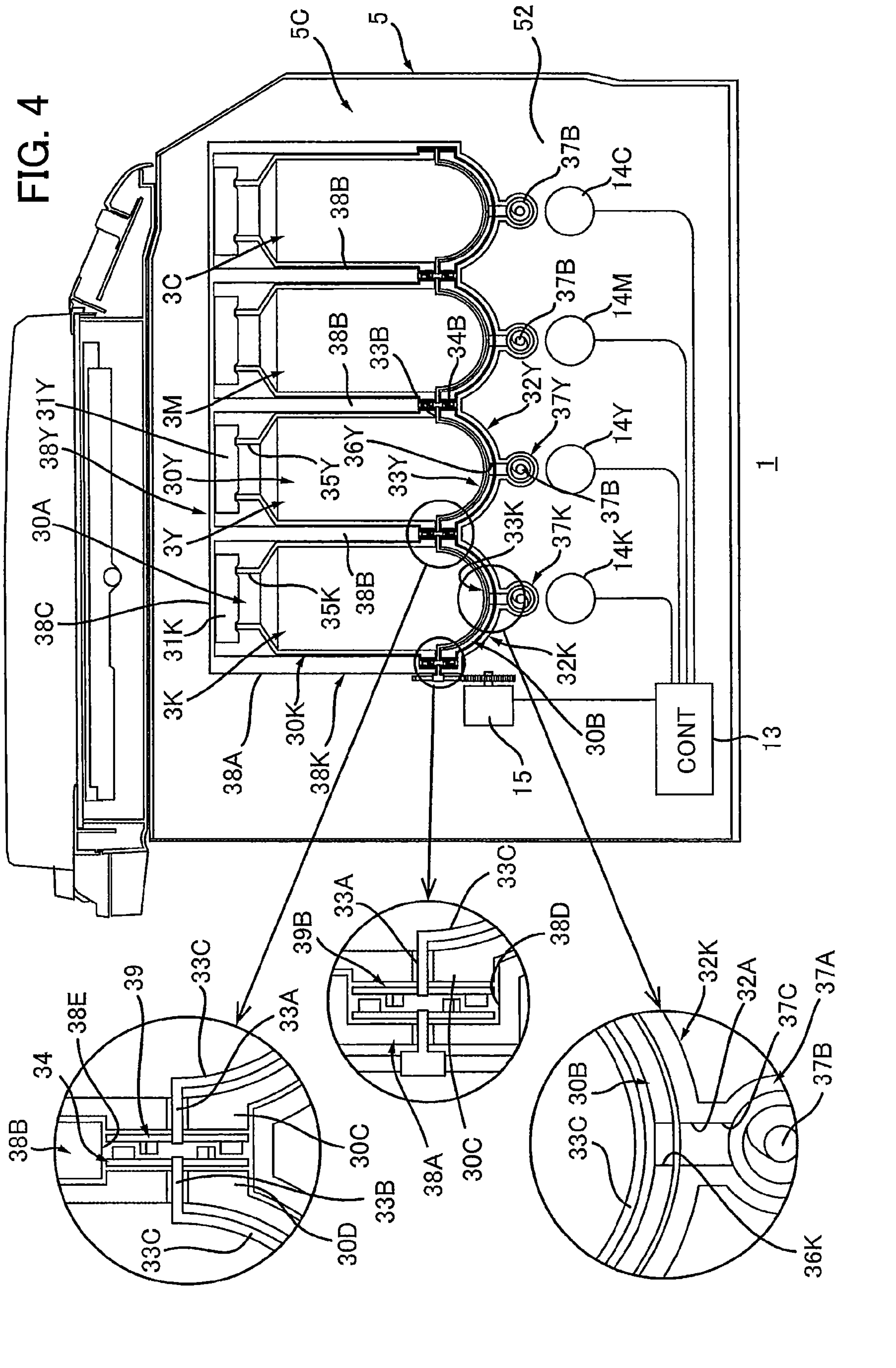
FIG. 4 is a cross-sectional view of a plurality of toner supply units provided in the image forming apparatus shown in FIG. 1.
Figure 5:
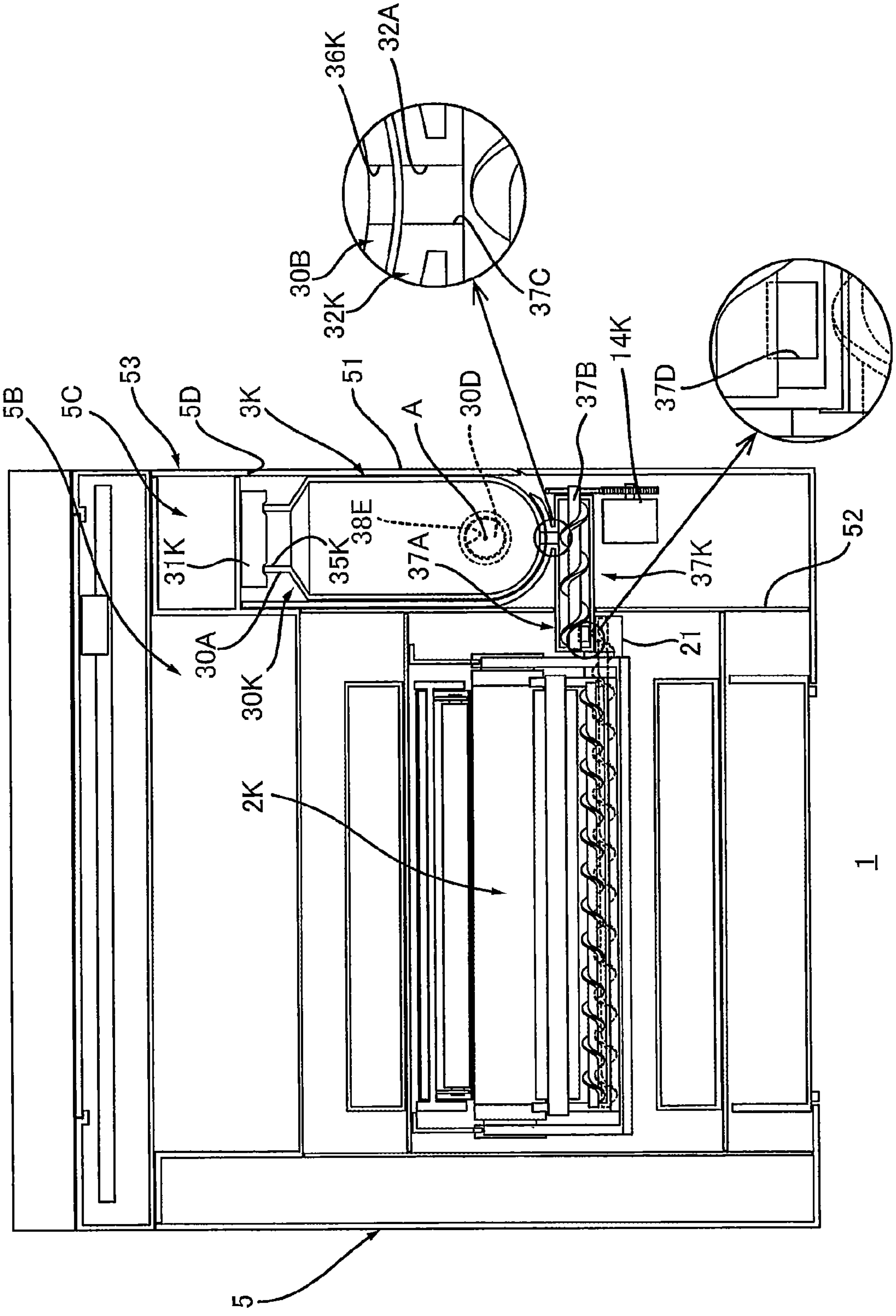
FIG. 5 is a cross-sectional view of the first toner supply unit and the first developing unit shown in FIG. 4, and illustrating the first container positioned at the first position, in which the first agitator is omitted.

As illustrated in FIG. 4, the image forming apparatus 1 further includes the plurality of toner supply units 3K, 3Y, 3M, and 3C. The plurality of toner supply units 3K, 3Y, 3M, and 3C are accommodated in a second interior space 5C defined in the main casing 5. Specifically, as illustrated in FIG. 5, the main casing 5 has the second interior space 5C, a partition wall 52, and a side frame 53. The first interior space 5B and the second interior space 5C are arranged in the first direction. The partition wall 52 partitions the first and second interior spaces 5B and 5C. The partition wall 52 extends in the vertical direction.

The side frame 53 is positioned on the opposite side to the first interior space 5B with respect to the partition wall 52. The side frame 53 is separated from the partition wall 52 at an interval in the first direction. The second interior space 5C is positioned between the partition wall 52 and the side frame 53. The side frame 53 extends in the vertical direction. The side frame 53 has a second opening 5D and a second cover 51. The second opening 5D is in communication with the second interior space 5C. As will be described later in detail, the second opening 5D is used when toner is supplied to the toner supply units 3 (see FIG. 6). The second cover 51 is fixed to a first container 30K (described later). The second cover 51 opens or closes the second opening 5D, as the first container 30K (described later) rotates.

3. Details of Plurality of Toner Supply Units 3K, 3Y, 3M, and 3C

As illustrated in FIG. 4, specifically, the plurality of toner supply units 3K, 3Y, 3M, and 3C has the first, second, third, and fourth toner supply units 3K, 3Y, 3M, and 3C. The first, second, third, and fourth toner supply units 3K, 3Y, 3M, and 3C are arranged at intervals in the direction in which the photosensitive drums are arranged. The first, second, third, and fourth toner supply units 3K, 3Y, 3M, and 3C have the same configurations as each other. Therefore, the following description describes the first and second toner supply units 3K and 3Y, and detailed description of the third and fourth toner supply units 3M and 3C will be omitted.

3.1 First Toner Supply Unit 3K

The first toner supply unit 3K is configured to supply toner to the first developing unit 2K (see FIG. 5). The first toner supply unit 3K and the first developing unit 2K are arranged in the first direction (see FIG. 5). The first toner supply unit 3K includes a first container support 38K, the first container 30K, a first lid 31K, a first shutter 32K, a first transfer unit 37K, and the first agitator 33K.

3.1.1 First Container Support 38K

The first container support 38K accommodates the first container 30K. The first container support 38K is fixed to the main casing 5. Specifically, the first container support 38K is fixed to the partition wall 52. The first container support 38K includes a first wall 38A, a second wall 38B, and a third wall 38C. The first and second walls 38A and 38B are disposed at an interval in the direction in which the toner supply units are arranged. The first wall 38A is positioned on the opposite side to the second wall 38B with respect to the first container 30K. The first and second walls 38A and 38B extend in the vertical direction, respectively. As will be described later in detail, the first wall 38A has a recess 38D. As will be described later in detail, the second wall 38B has a hole 38E. The third wall 38C connects an upper end portion of the first wall 38A and an upper end portion of the second wall 38B. The first shutter 32K connects a lower end portion of the first wall 38A and a lower end portion of the second wall 38B.

3.1.2 First Container 30K

The first container 30K accommodates toner. The first container 30K has a first inlet opening 35K and a first outlet opening 36K. The first inlet opening 35K is used to pass toner therethrough. The first outlet opening 36K is used to discharge the toner therethrough. The first container 30K extends in a second direction. The second direction crosses both the first direction and the direction in which the toner supply units are arranged. The first container 30K has an opening portion 30A at one end portion and a bottom portion 30B at the other end portion in the second direction. The opening portion 30A has a cylindrical shape. The opening portion 30A has the first inlet opening 35K. The bottom portion 30B has a semispherical shape. The bottom portion 30B has the first outlet opening 36K. The first inlet opening 35K and the first outlet opening 36K are arranged in the second direction.

3.1.3 First Lid 31K

The first lid 31K closes the first inlet opening 35K. The first lid 31K is disposed at the opposite side of the first shutter 32K with respect to the first container 30K. The first lid 31K is fixed to the third wall 38C. The first lid 31K is positioned between the third wall 38C and the first container 30K. The first lid 31K closes the first inlet opening 35K by contacting the opening portion 30A. The first lid 31K is made from an elastic material (e.g., rubber and sponge).

3.1.4 First Shutter 32K

The first shutter 32K opens the first outlet opening 36K when the first lid 31K closes the first inlet opening 35K. The first shutter 32K closes the first outlet opening 36K when the first lid 31K opens the first inlet opening 35K (see FIG. 6). The first shutter 32K and the first lid 31K are disposed opposite to each other with respect to the first container 30K. The first shutter 32K is in contact with the bottom portion 30B. The first shutter 32K extends along the bottom portion 30B. The first shutter 32K has a semispherical shape. The first shutter 32K has a shutter opening 32A. The shutter opening 32A is in communication with the first outlet opening 36K when the first lid 31K closes the first inlet opening 35K.

3.1.5 First Transfer Unit 37K

As illustrated in FIG. 5, the first transfer unit 37K is configured to transfer toner discharged from the first container 30K to the first developing unit 2K. The first transfer unit 37K and the first container 30K are disposed opposite to each other with respect to the first shutter 32K. The first transfer unit 37K is fixed to the partition wall 52 and the first shutter 32K. The first transfer unit 37K incudes a transfer tube 37A and an auger 37B. The transfer tube 37A extends in the first direction. The transfer tube 37A has one end portion and the other end portion in the first direction. The one end portion of the transfer tube 37A and the other end portion of the transfer tube 37A are separated from each other in the first direction. The one end portion of the transfer tube 37A is fixed to the first shutter 32K. The one end portion of the transfer tube 37A has an inlet hole 37C. The inlet hole 37C is in communication with the shutter opening 32A. The other end portion of the transfer tube 37A is fixed to the partition wall 52. The other end portion of the transfer tube 37A passes through the partition wall 52 in the first direction. The other end portion of the transfer tube 37A is positioned in the first interior space 5B.

The other end portion of the transfer tube 37A has an outlet hole 37D. In a state where the process unit 4 is positioned at the attached position, the other end portion of the transfer tube 37A is coupled to the first developing unit 2K. The first developing unit 2K includes a joint 21 (see FIG. 2). The joint 21 is configured to couple to the other end portion of the transfer tube 37A. The joint 21 is configured to accept toner discharged from the outlet hole 37D.

When the process unit 4 is to be moved from the attached position to the withdrawn position, the process unit 4 is first moved downward to disconnect the transfer tube 37A and the joint 21. The process unit 4 is then withdrawn to the withdrawn position (see FIG. 3). The auger 37B is positioned in the transfer tube 37A. The auger 37B extends in the first direction. The auger 37B transfers toner so that the toner is carried from the inlet hole 37C to the outlet hole 37D.

3.1.6 First Agitator 33K

As illustrated in FIG. 4, the first agitator 33K is disposed in the first container 30K. The first agitator 33K agitates toner in the first container 30K. The first agitator 33K is rotatable about the axis extending in the direction in which the toner supply units are arranged. Therefore, the first agitator 33K agitates toner in the first container 30K to ensure fluidity of the toner. The first agitator 33K has a wired shape. Therefore, the wired shape of the first agitator 33K avoids hindering the toner supply to the first container 30K, compared with the first agitator 33K having an agitating blade.

The first agitator 33K includes a first portion 33A, a second portion 33B, and a third portion 33C. The first portion 33A is positioned at a one end portion of the first agitator 33K in the direction in which a rotation axis A of the first agitator extends. The second portion 33B is positioned at the other end portion of the first agitator 33K in the direction in which the rotation axis A of the first agitator extends. The first and second portions 33A and 33B are separated from each other in the direction in which the rotation axis A of the first agitator extends. The third portion 33C is positioned between the first and second portions 33A and 33B. The first and second portions 33A and 33B respectively extend in the direction in which the rotation axis of the first agitator extends. The first and second portions 33A and 33B are respectively rotatably supported by the first container 30K. The third portion 33C is positioned in the bottom portion 30B of the first container 30K. The third portion 33C extends along the bottom portion 30B. The third portion 33C has a semi-arc shape.

3.1.7 Pivotal Movement of First Container 30K

Figure 6:
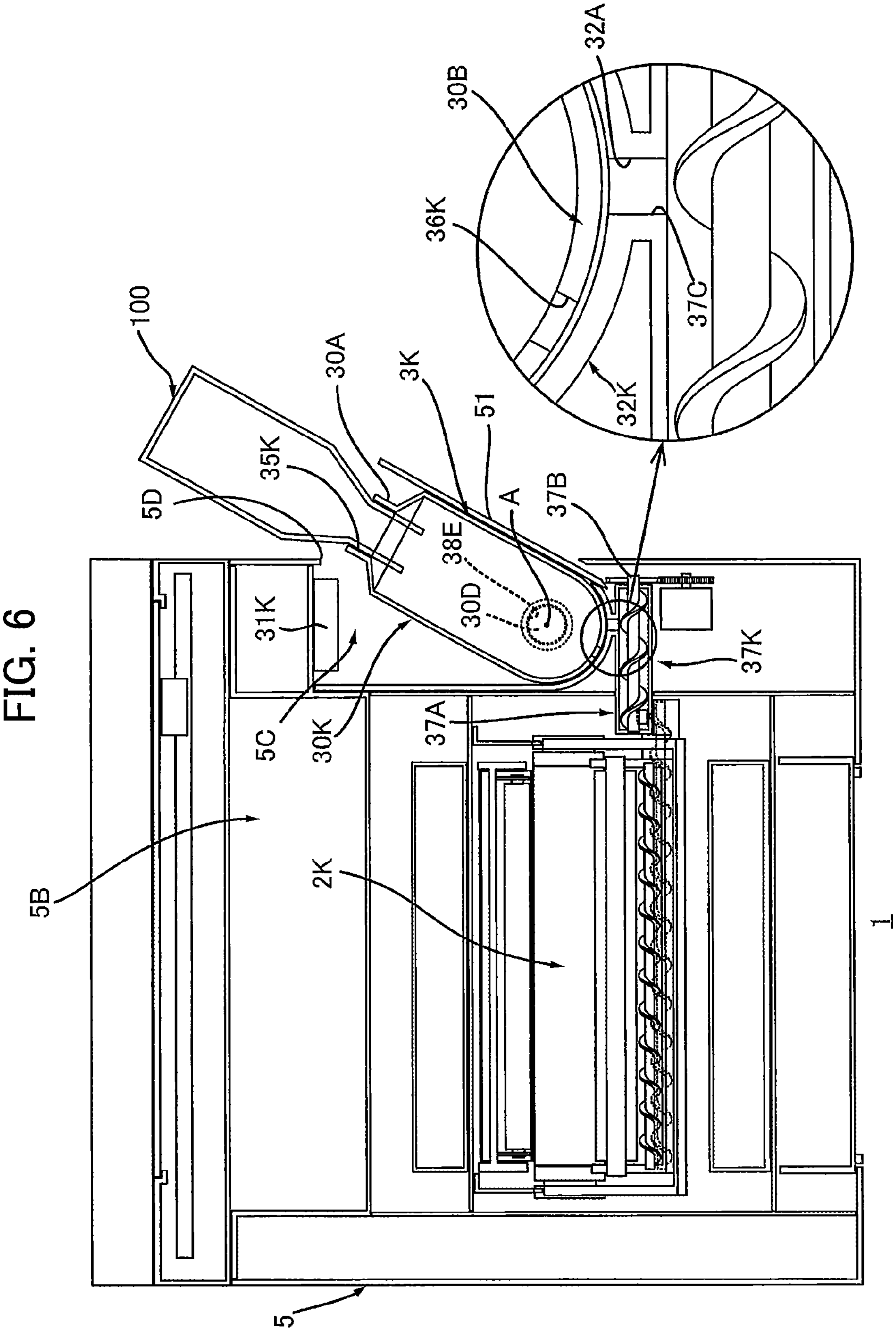
FIG. 6 is a cross-sectional view of the first toner supply unit and the first developing unit shown in FIG. 4, and illustrating the first container positioned at the second position, in which the first agitator is omitted.

The first container 30K is pivotally movable about the rotation axis A of the first agitator 33K between a first position (see FIG. 5) and a second position (see FIG. 6). In a state where the first container 30K is at the first position, the first lid 31K closes the first inlet opening 35K. In a state where the first container 30K is at the second position, the first lid 31K opens the first inlet opening 35K. The first container 30K further includes a first protrusion 30C and a second protrusion 30D. The first and second protrusions 30C and 30D are disposed on an outer surface of the first container 30K. In the direction in which the rotation axis A of the first agitator extends, the first and second protrusions 30C and 30D are disposed opposite to each other with respect to an interior space of the first container 30K. The first and second protrusions 30C and 30D protrude from the outer surface of the first container 30K. The first and second protrusions 30C and 30D respectively extend in the direction in which the rotation axis A of the first agitator extends. The first and second protrusions 30C and 30D respectively have a columnar shape.

The axis of the first protrusion 30C approximately matches the rotation axis A of the first agitator 33K (see FIG. 5). The first portion 33A of the first agitator 33K passes through the first protrusion 30C along the axis of the columnar-shaped first protrusion 30C. The first protrusion 30C is fitted to the recess 38D of the first wall 38A. The recess 38D is positioned in the surface of the first wall 38A facing the first container 30K. The recess 38D has a circular shape. The recess 38D has an inner diameter approximately identical to an outer diameter of the first protrusion 30C. An axis of the second columnar-shaped protrusion 30D approximately matches the rotation axis A of the first agitator 33K (see FIG. 5). The second portion 33B of the first agitator 33K passes through the second protrusion 30D along the axis of the second protrusion 30D. The second protrusion 30D fits to the hole 38E of the second wall 38B. The hole 38E has a circular shape. The hole 38E has an inner diameter approximately identical to an outer diameter of the second protrusion 30D. Therefore, the first container 30K is movable between the first position (see FIG. 5) and the second position (see FIG. 6) about the first and second protrusions 30C and 30D which are served as pivot points, relative to the first container support 38K.

As illustrated in FIG. 5, in a state where the first container 30K is positioned at the first position, the first container 30K is positioned in the second interior space 5C. In a state where the first container 30K is positioned at the first position, the opening portion 30A is in contact with the first lid 31K. Therefore, the first lid 31K closes the first inlet opening 35K. In a state where the first container 30K is positioned at the first position, the first shutter 32K opens the first outlet opening 36K. Specifically, in a state where the first container 30K is positioned at the first position, the shutter opening 32A of the first shutter 32K is in communication with the first outlet opening 36K. Therefore, the first shutter 32K opens the first outlet opening 36K.

As illustrated in FIG. 6, in a state where the first container 30K is positioned at the second position, the opening portion 30A of the first container 30K is positioned outside the second interior space 5C through the second opening 5D. In a state where the first container 30K is positioned at the second position, the opening portion 30A is disengaged from the first lid 31K. Therefore, the first lid 31K opens the first inlet opening 35K. In a state where the first container 30K is positioned at the second position, the first shutter 32K closes the first outlet opening 36K. Specifically, as the first container 30K rotates, the first outlet opening 36K is moved from the shutter opening 32A. The first outlet opening 36K faces other than the shutter opening 32A of the first shutter 32K. Therefore, the first shutter 32K closes the first outlet opening 36K. In a state where the first container 30K is positioned at the second position, a user is able to supply toner to the first container 30K. Specifically, the user is able to insert a toner bottle 100 containing the toner into the first inlet opening 35K. Therefore, the toner flows from the toner bottle 100 into the first container 30K. At this time, the first shutter 32K closes the first outlet opening 36K. Therefore, when the toner flows into the first container 30K, the toner is neither allowed to pass through the first outlet opening 36K, nor supplied to the first transfer unit 37K and the first developing unit 2K. When the toner is fully supplied, the user is able to rotate the first container 30K from the second position to the first position (see FIG. 5).

3.2 Second Toner Supply Unit 3Y

As illustrated in FIG. 4, the second toner supply unit 3Y is juxtaposed with the first toner supply unit 3K in the direction in which the rotation axis of the first agitator extends. The second toner supply unit 3Y is configured to supply toner to the second developing unit 2Y (see FIG. 1). The second toner supply unit 3Y includes a second container support 38Y, a second container 30Y, a second lid 31Y, a second shutter 32Y, a second transfer unit 37Y, and a second agitator 33Y.

The second container support 38Y accommodates the second container 30Y. The second container support 38Y is fixed to the main casing 5. Specifically, the second container support 38Y is fixed to the partition wall 52. The first and second container supports 38K and 38Y are integral. The second container support 38Y has the same configuration as the configuration of the first container support 38K, except that the second container support 38Y does not have the first wall 38A. The second container support 38Y shares the second wall 38B of the first container support 38K.

The second container 30Y has the same configuration as the configuration of the first container 30K. The second container 30Y accommodates toner. The second container 30Y includes a second inlet opening 35Y and a second outlet opening 36Y. The second inlet opening 35Y is used to pass toner therethrough. The second outlet opening 36Y is used to discharge the toner therethrough. The second lid 31Y has the same configuration as the configuration of the first lid 31K. The second lid 31Y closes the second inlet opening 35Y. The second shutter 32Y has the same configuration as the configuration of the first shutter 32K.

When the second lid 31Y closes the second inlet opening 35Y, the second shutter 32Y opens the second outlet opening 36Y. When the second lid 31Y opens the second inlet opening 35Y, the second shutter 32Y closes the second outlet opening 36Y. The second transfer unit 37Y has the same configuration of the configuration of the first transfer unit 37K. The second agitator 33Y has the same configuration of the configuration of the first agitator 33K. The second agitator 33Y is disposed in the second container 30Y. The second agitator 33Y agitates toner in the second container 30Y. The second container 30Y is rotatable about a rotation axis of the second agitator between a first position and a second position. At the first position, the second lid 31Y closes the second inlet opening 35Y. At the second position, the second lid 31Y opens the second inlet opening 35Y.

3.3 First Coupling 34 and Second Coupling 39

The first and second agitators 33K and 33Y are coupled to each other to transmit a driving force therebetween. The first agitator 33K includes a first coupling 34. The second agitator 33Y includes a second coupling 39. The second coupling 39 is capable of being coupled to the first coupling 34. The first coupling 34 and the third portion 33C of the first agitator 33K are disposed opposite to each other with respect to the second protrusion 30D of the first container 30K. The first coupling 34 is fixed to the second portion 33B of the first agitator 33K. The first coupling 34 is disposed in the hole 38E of the second wall 38B. The second coupling 39 and a third portion 33C of the second agitator 33Y are disposed opposite to each other with respect to a first protrusion 30C of the second container 30Y. The second coupling 39 is fixed to a first portion 33A of the second agitator 33Y. The second coupling 39 is disposed in the hole 38E. In the hole 38E, the second coupling 39 is engaged with the first coupling 34.

Figure 7:
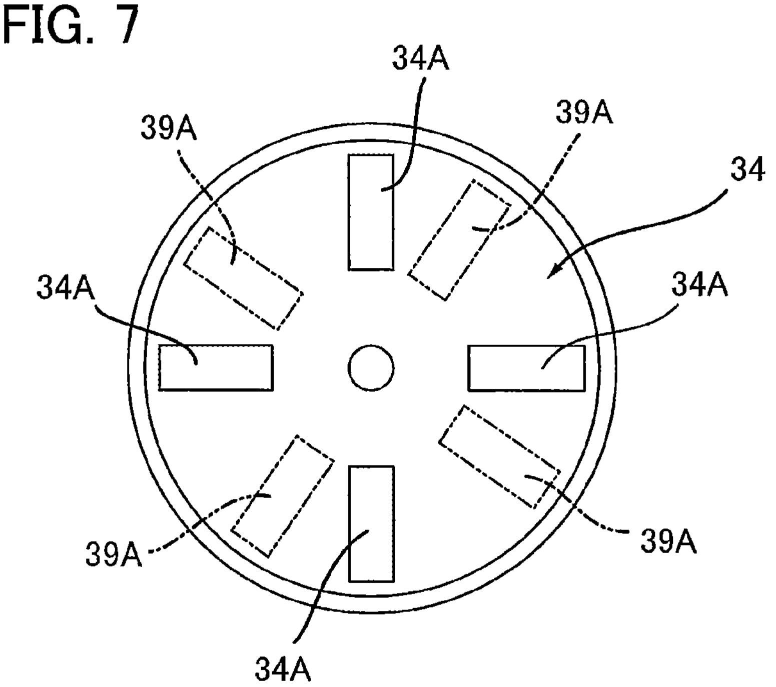
FIG. 7 is a front view of the first coupling shown in FIG. 4 and illustrating a plurality of second protrusions provided in the second coupling.
Figure 8:
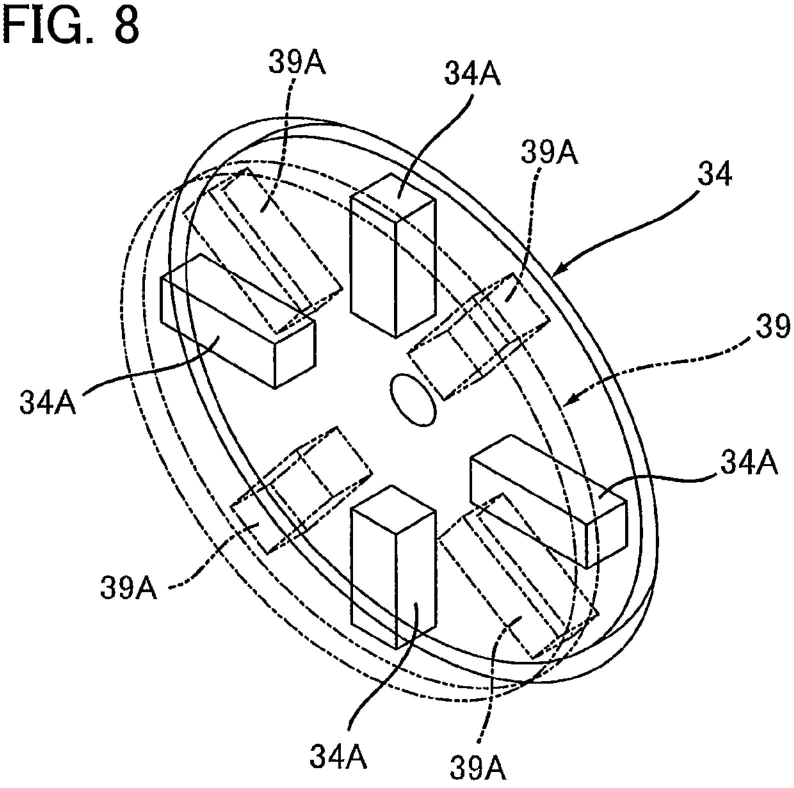
FIG. 8 is a perspective view showing an engaged condition of the first coupling and the second coupling shown in FIG. 4 and illustrating the second coupling with a vertical line.

As illustrated in detail in FIGS. 7 and 8, the first coupling 34 includes a plurality of first protrusions 34A. The plurality of first protrusions 34A is disposed at intervals in the rotation direction of the first agitator. The second coupling 39 includes a plurality of second protrusions 39A. The plurality of second protrusions 39A is disposed at intervals in the rotation direction of the second agitator. The second protrusions 39A are respectively disposed between two adjacent first protrusions of the plurality of first protrusions 34A. Therefore, as the first agitator 33K rotates, the first protrusions 34A respectively come into contact with the second protrusions 39A. Accordingly, a driving force is transmitted from the first agitator 33K to the second agitator 33Y. The first coupling 34 and the second coupling 39 allow the first container 30K to move relative to the second container 30Y in the state where the first coupling 34 and the second coupling 39 are engaged with each other. In a state where the first agitator 33K is in a halt condition, the first and second protrusions 34A and 39A positioned adjacent to each other are separated at intervals in the rotation direction of the first agitator. Therefore, the first and second couplings 34 and 39 can rotate relative to each other by an amount corresponding to each of the intervals between the first and second protrusions 34A and 39A positioned adjacent to each other. Accordingly, in the state where the first and second couplings 34 and 39 are engaged with each other, either one of the first and second containers 30K and 30Y can rotate from the first position to the second position, in a state where the other of the first and second containers 30K and 30Y is maintained at the first position.

Further, as illustrated in FIG. 4, the first agitator 33K is configured to receive an external driving force. The first agitator 33K includes a third coupling 39B. The third coupling 39B has the same configuration as the configuration of the second coupling 39. The third coupling 39B and the third portion 33C of the first agitator 33K are disposed opposite to each other with respect to the first protrusion 30C of the first container 30K. The third coupling 39B is fixed to the first portion 33A of the first agitator 33K. The third coupling 39B is disposed in the recess 38D of the first wall 38A. The second agitator 33Y is configured to transmit a driving force transmitted from the first agitator 33K to a third agitator included in the third toner supply unit 3M. The second agitator 33Y includes a fourth coupling 34B. The fourth coupling 34B has the same configuration as the configuration of the first coupling 34. The fourth coupling 34B is fixed to a second portion 33B of the second agitator 33Y.

3.4 Controller 13, First Drive Unit 15, and Plurality of Second Drive Units 14K, 14Y, 14M, and 14C The image forming apparatus 1 is configured to apply a driving force to the first agitator 33K. The image forming apparatus 1 is also configured to apply a driving force to a plurality of the augers 37B. The image forming apparatus 1 includes a controller 13, a first drive unit 15, and a plurality of second drive units 14K, 14Y, 14M, and 14C. The controller 13 controls the first drive unit 15 and the plurality of second drive units 14K, 14Y, 14M, and 14C. The controller 13 is electrically coupled to each of the plurality of second drive units 14K, 14Y, 14M, and 14C and the first drive unit 15. The first drive unit 15 is configured to apply a driving force to the first agitator 33K. Specifically, the first drive unit 15 is configured to apply the driving force to the third coupling 39B of the first agitator 33K. The first drive unit 15 has a conventional motor. When the first drive unit 15 applies a driving force to the first agitator 33K, the driving force is sequentially transmitted to the first agitator 33K, the second agitator 33Y, the third agitator included in the third toner supply unit 3M, and a fourth agitator included in the fourth toner supply unit 3C. Therefore, the first agitator 33K, the second agitator 33Y, the third agitator, and the fourth agitator are driven together.

The second drive unit 14K corresponds to the auger 37B included in the first toner supply unit 3K. The second drive unit 14K can apply a driving force to the auger 37B. The second drive unit 14Y corresponds to the auger 37B included in the second toner supply unit 3Y. The second drive unit 14Y can apply a driving force to the auger 37B. The second drive unit 14M corresponds to the auger 37B included in the third toner supply unit 3M. The second drive unit 14M can apply a driving force to the auger 37B. The second drive unit 14C corresponds to the auger 37B included in the fourth toner supply unit 3C. The second drive unit 14C can apply a driving force to the auger 37B. The plurality of second drive units 14K, 14Y, 14M, and 14C respectively include a conventional motor. Therefore, each of the plurality of augers 37B is driven independently.

4. Effects

As illustrated in FIG. 5, the electrophotographic type image forming apparatus 1 can be provided with a tank-supply type unit widely applied in inkjet type image forming apparatuses, instead of a cartridge type unit.

When the first lid 31K closes the first inlet opening 35K, the first shutter 32K opens the first outlet opening 36K. Therefore, when the first lid 31K closes the first inlet opening 35K, the first toner supply unit 3K can supply toner to the first developing unit 2K via the first outlet opening 36K. As illustrated in FIG. 6, when the first lid 31K opens the first inlet opening 35K, the first shutter 32K closes the first outlet opening 36K. When the first lid 31K opens the first inlet opening 35K, the first container 30K receives toner via the first inlet opening 35K. In other words, when toner is to be supplied to the first container 30K, the first shutter 32K closes the first outlet opening 36K. Therefore, the first shutter 32K prohibits the toner from flowing through the first outlet opening 36K into the first transfer unit 37K and the first developing unit 2K. As a result, when the toner is supplied to the first container 30K, the toner is restricted from being leaked from the first developing unit 2K.

5. Second Embodiment

Figure 9:
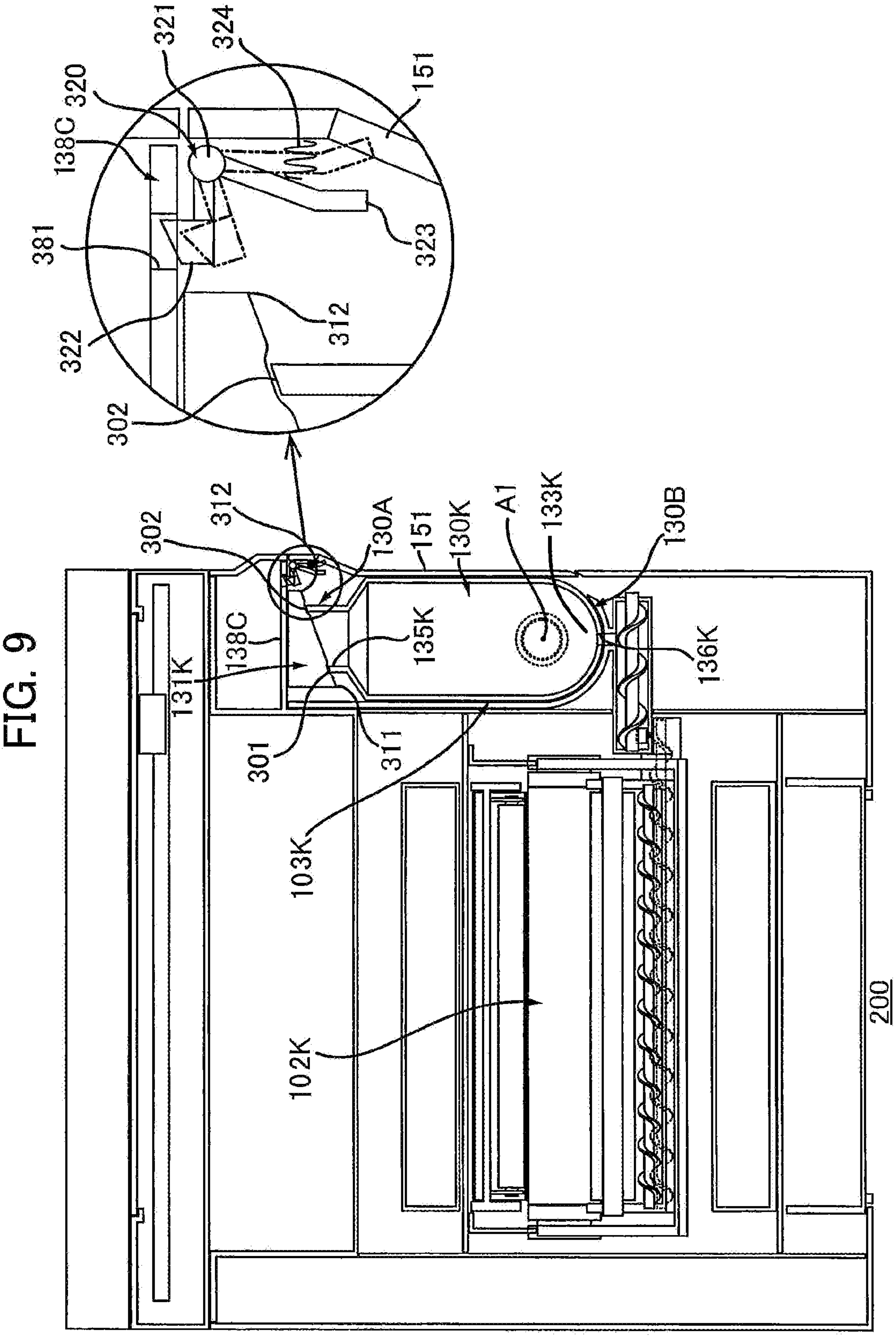
FIG. 9 is a cross-sectional view of an image forming apparatus according to the second embodiment.

An image forming apparatus 200 according to the second embodiment will now be described herein with reference to FIG. 9. It should be noted that, in the image forming apparatus 200 according to the second embodiment, identical or corresponding components of the first embodiment described above are assigned reference numerals which are added a hundred to the original numerals in the first embodiment, respectively, and duplicated descriptions are omitted. In the image forming apparatus 200, a first container 130K has an opening portion 130A and a bottom portion 130B. The opening portion 130A has a first inlet opening 135K. The bottom portion 130B has a first outlet opening 136K. The opening portion 130A and the bottom portion 130B are disposed opposite to each other with respect to the rotation axis A1 of a first agitator 133K. In the second direction in which the first inlet opening 135K and the first outlet opening 136K are aligned, the opening portion 130A is positioned at one end portion, in a state where the bottom portion 130B is positioned at the other end portion. The second direction is one example of the arraying direction. An end surface of the opening portion 130A is inclined in the direction crossing the first direction.

The opening portion 130A has one end 301 and another end 302 that are aligned in the first direction, in a state where the first container 130K is positioned at the first position. The one end 301 and the another end 302 are disposed opposite to each other with respect to the first inlet opening 135K in the first direction. The another end 302 is positioned farther from the first developing unit 102K in the first direction than the one end 301 is from the first developing unit 102K. The another end 302 is positioned farther from the first outlet opening 136K in the second direction than the one end 301 is from the first outlet opening 136K.

A lower surface of a first lid 131K is inclined so as to conform to the end surface of the opening portion 130A. The first lid 131K includes one end 311 and another end 312 in the first direction. The another end 312 is positioned farther from the first developing unit 102K in the first direction than the one end 311 is from the first developing unit 102K. The another end 312 is positioned farther from the first outlet opening 136K in the second direction than the one end 311 is from the first outlet opening 136K. In the second embodiment described above, the end surface of the opening portion 130A is inclined so that the another end 302 is positioned farther from the first outlet opening 136K than the one end 301 is from the first outlet opening 136K. The lower surface of the first lid 131K is inclined so that the another end 312 is positioned farther from the first outlet opening 136K than the one end 311 is from the first outlet opening 136K. Therefore, the first container 130K can be pivotally moved smoothly between the first and second positions. In a state where the first container 130K is positioned at the first position, the opening portion 130A is in contact with the inclined lower surface of the first lid 131K. In this state, the first container 130K is pressed in a direction from the first position to the second position with an elastic force of the first lid 131K. To act against this elastic force, the image forming apparatus 200 further includes a lock mechanism 320 and a spring 324. The lock mechanism 320 prohibits the first container 130K from being moved. The lock mechanism 320 is movable between a lock position and an unlock position (illustrated with a virtual line). At the lock position, the first container 130K is prohibited from being moved. At the unlock position, the first container 130K is allowed to be moved. The lock mechanism 320 is rotatable between the lock and unlock positions about the axis extending in the direction of the axis of the first agitator. The lock mechanism 320 is fixed to a second cover 151. The lock mechanism 320 includes a shaft 321, a hook 322, and an arm 323. The shaft 321 extends along the pivotal axis of the lock mechanism 320. The shaft 321 is rotatably supported by the second cover 151. The hook 322 is positioned below a third wall 138C. The hook 322 extends in the first direction. The hook 322 is fixed to the shaft 321. The arm 323 is disposed at an interval from the second cover 151 in the first direction. The arm 323 extends in the vertical direction. The arm 323 is fixed to the shaft 321. The spring 324 presses the lock mechanism 320 so that the lock mechanism 320 is urged to the lock position. The spring 324 is positioned between the arm 323 and the second cover 151. The spring 324 extends in the first direction. The spring 324 is compressed in the first direction while being intervened between the arm 323 and the second cover 151. The compressed spring 324 presses the arm 323 by means of an elastic force thereof. Therefore, the lock mechanism 320 is forced to be maintained at the lock position. In a state where the lock mechanism 320 is positioned at the lock position, the hook 322 is fitted to a hole 381 formed in the third wall 138C.

To pivotally move the first container 130K from the first position to the second position, the lock mechanism 320 is pivotally moved against the elastic force of the spring 324 from the lock position to the unlock position. In a state where the lock mechanism 320 is positioned at the unlock position, the hook 322 becomes disengaged from the hole 381 formed in the third wall 138C. In this way, the first container 130K is allowed to pivotally move from the first position to the second position. With the second embodiment described above, similar effects to those of the first embodiment can be achieved.

6. Third Embodiment

Figure 10:
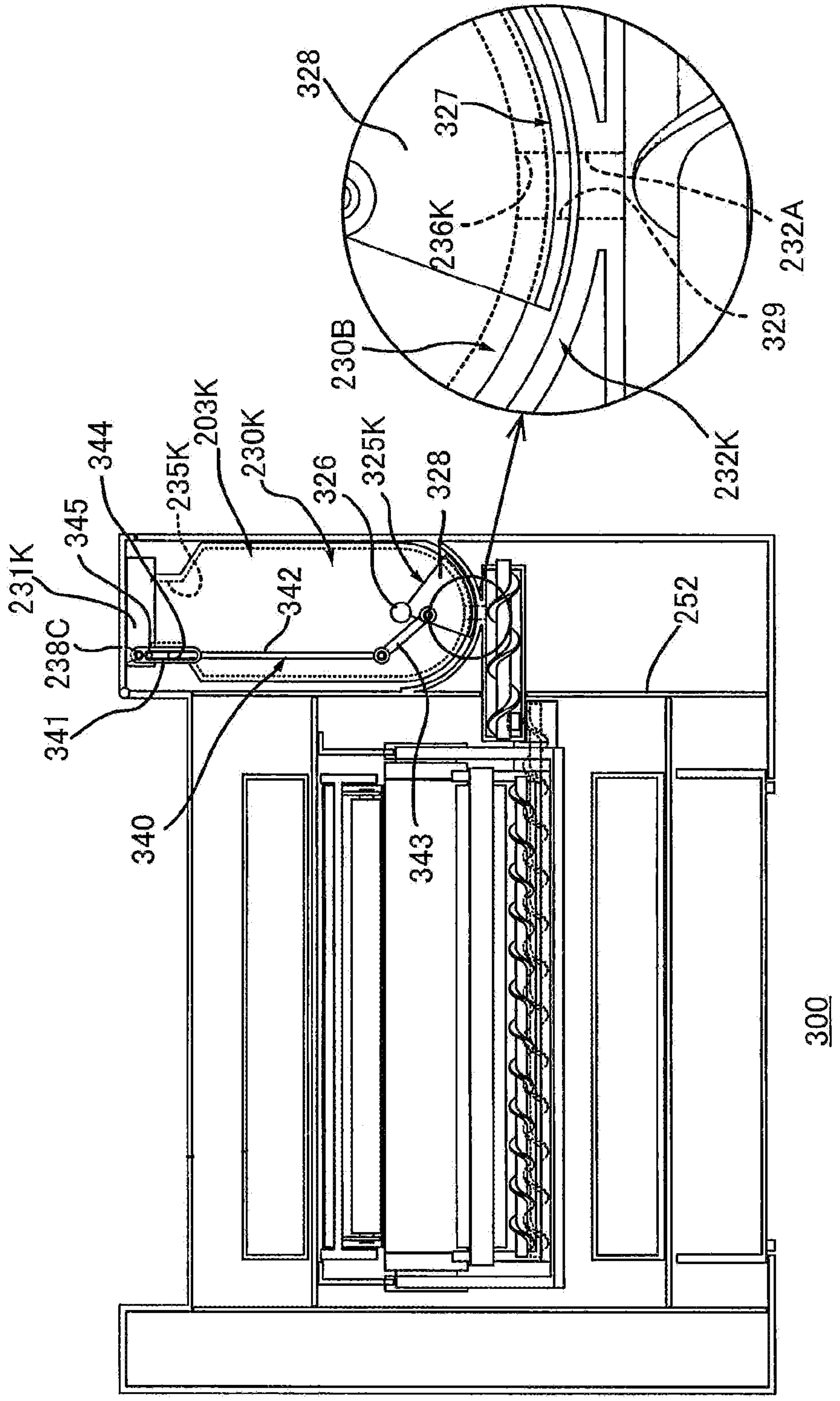
FIG. 10 is a cross-sectional view of an image forming apparatus according to the third embodiment, and illustrating the condition in which the first lid is at a closed position and the first shutter is at a discharge position.

An image forming apparatus 300 according to the third embodiment will now be described herein with reference to FIGS. 10 and 11. It should be noted that, in the image forming apparatus 300 according to the third embodiment, identical or corresponding components of the first embodiment described above are assigned reference numerals which are added two hundreds to the original numerals in the first embodiment, respectively, and duplicated descriptions are omitted.

Figure 11:
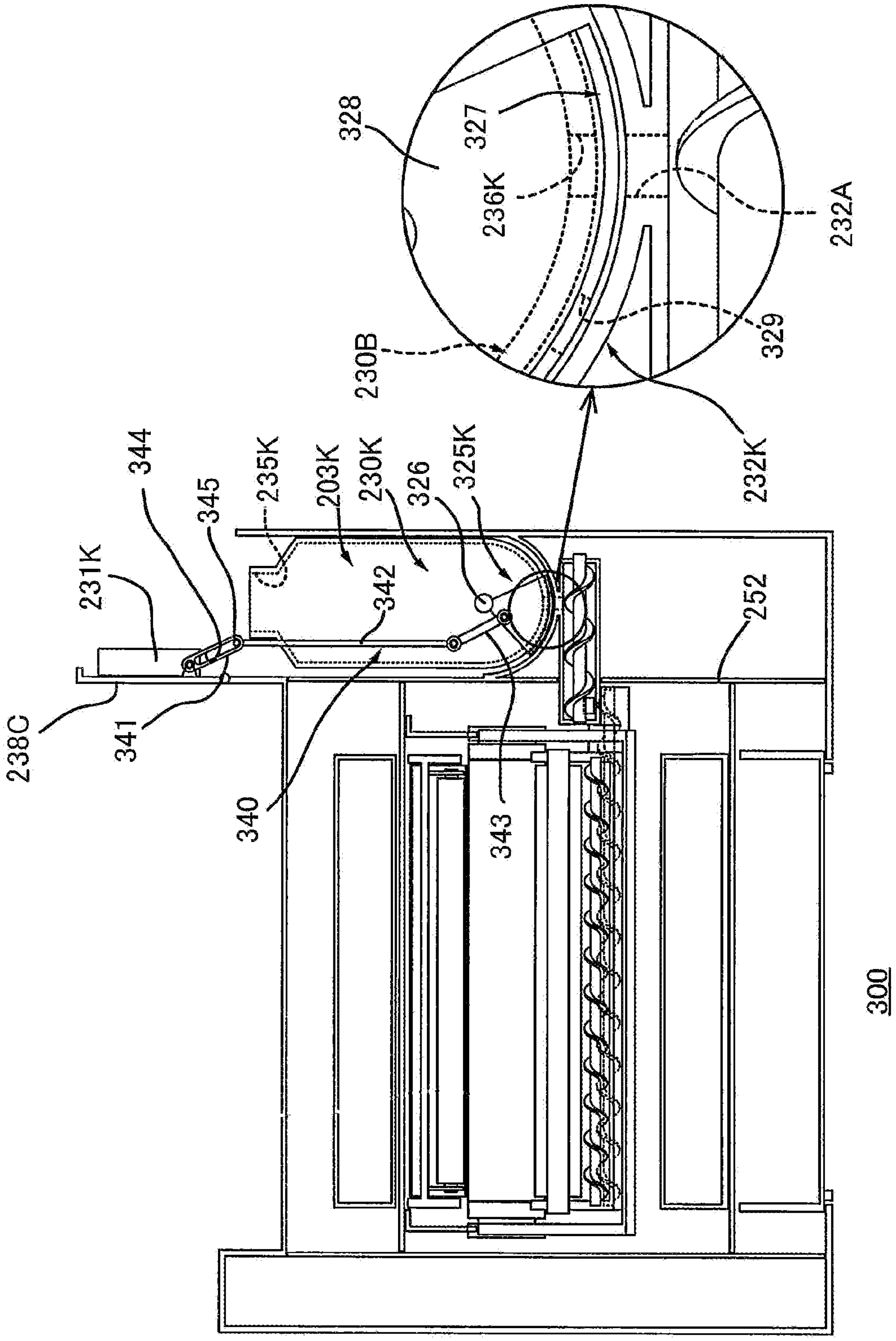
FIG. 11 is a cross-sectional view of an image forming apparatus according to the third embodiment, and illustrating the condition in which the first lid is at a closed position and the first shutter is at the discharge position.

In the image forming apparatus 300, a first lid 231K is movable between the closed position (see FIG. 10) and the open position (see FIG. 11). At the closed position, the first lid 231K closes a first inlet opening 235K. At the open position, the first lid 231K opens the first inlet opening 235K. In the image forming apparatus 300, a third wall 238C is pivotally supported by a partition wall 252. As the third wall 238C is pivotally moved, the first lid 231K moves between the closed position and the open position. A first toner supply unit 203K further includes a first shutter 325K and a link mechanism 340. In the image forming apparatus 300, a first container 230K is not pivotable, and a first shutter 232K does not have a shutter function. Therefore, the first shutter 232K is hereinafter referred to as a wall 232K, and a shutter opening 232A is hereinafter referred to as an opening 232A. The first shutter 325K is movable between a discharge position in a state where the first lid 231K is positioned at the closed position, and a closed position in a state where the first lid 231K is positioned at the open position (see FIG. 11). A first outlet opening 236K is open at the discharge position. The first outlet opening 236K is closed at the closed position. The first shutter 325K is pivotally moved between the discharge and closed positions about an axis extending in the direction of the axis of the first agitator. The first shutter 325K includes a shaft 326, a shutter member 327, and a linkage 328. The shaft 326 extends along the rotation axis of the first shutter 325K. The shaft 326 is rotatably supported by the first container 230K. The shutter member 327 is positioned between a bottom portion 230B of the first container 230K and the wall 232K. The shutter member 327 has an arc shape. The curvature of the shutter member 327 conforms to the curvature of the bottom portion 230B. The shutter member 327 has a shutter opening 329. The linkage 328 couples the shutter member 327 and the shaft 326. In a state where the first shutter 325K is positioned at the discharge position, the shutter opening 329 is in communication with both of the first outlet opening 329 and the opening 232A. In a state where the first shutter 325K is positioned at the closed position, the shutter opening 329 is shifted from the first outlet opening 236K. The first outlet opening 236K faces art of the shutter member 327 other than the shutter opening 329 (see FIG. 11).

The link mechanism 340 links a movement of the first lid 231K and a movement of the first shutter 325K. The link mechanism 340 includes a first link 341, a second link 342, and a third link 343. The first link 341 is pivotally supported by the third wall 238C. The first link 341 has a long hole 344. The second link 342 couples the first and third links 341 and 343 with each other. The second link 342 includes a boss 345. The second link 342 extends in the vertical direction. The boss 345 is disposed at an upper end portion of the second link 342. The boss 345 is fitted to the long hole 344. A lower end portion of the second link 342 is pivotally coupled to the third link 343. The third link 343 couples the second link 342 and the linkage 328 with each other. The third link 343 has one end portion pivotally coupled to the second link 342, and the other end portion pivotally coupled to the linkage 328. The one end portion and the other end portion of the third link 343 are separated from each other. In a state where the first lid 231K is positioned at the closed position, the boss 345 is positioned at an end portion of the long hole 344. At this time, the first shutter 325K is positioned at the discharge position.

As illustrated in FIG. 11, when the first lid 231K is moved from the closed position to the open position, the first link 341 causes the boss 345 to be moved from the one end portion of the long hole 344 to the other end portion. The first link 341 then pulls the boss 345. Therefore, the first link 341 pulls the second and third links 342 and 343. As a result, the first shutter 325K pivotally moves from the discharge position to the closed position. With the third embodiment described above, in a state where the first lid 231K is positioned at the closed position, the first shutter 325K can be securely positioned at the discharge position. In a state where the first lid 231K is positioned at the open position, the first shutter 325K can be securely positioned at the closed position. With the third embodiment described above, similar effects to those of the first embodiment can also be achieved.

While the description has been made in detail with reference to the embodiments thereof, it would be apparent to those skilled in the art that many modifications and variations may be made therein without departing from the spirit of the disclosure.

What is claimed is:

1. An image forming apparatus comprising:

a main casing having a first opening;

a developing unit having a developing roller and a developing container configured to accommodate toner therein;

a toner supply portion configured to supply toner to a toner conveying mechanism; and the toner conveying mechanism configured to convey toner supplied from the toner supply portion to the developing container, the toner supply portion including a toner container attachment wall supported by the main casing and configured to receive a toner container detachably attached to the main casing, the toner container accommodating toner therein, the toner container attachment wall having a toner inlet opening, through which toner is received from the toner container received by the toner container attachment wall, the developing unit being movable relative to the main casing through the first opening between a first position at which the developing unit is disposed inside the main casing, and a second position at which at least part of the developing unit is disposed outside the main casing, wherein, in a state where the developing unit is at the second position, the toner container attachment wall having the toner inlet opening is supported by the main casing, wherein the toner supply portion further includes an intermediate accommodating portion configured to temporarily accommodate therein toner received through the toner inlet opening from the toner container, the toner conveying mechanism being configured to convey toner supplied from the intermediate accommodating portion to the developing container, wherein, in the state where the developing unit is at the second position, at least part of the intermediate accommodating portion is supported by the main casing, wherein a toner flow passage is defined to extend from the toner inlet opening through the intermediate accommodating portion to the toner conveying mechanism, and wherein the image forming apparatus further comprises a shutter having a position that is variable, relative to the intermediate accommodating portion, between an open position and a closed position in accordance with whether toner should be supplied or not to the developing unit, the shutter at the open position opening the toner flow passage to allow toner supplied from the toner container to flow to the toner conveying mechanism, the shutter at the closed position blocking the toner flow passage.

2. The image forming apparatus according to claim 1, wherein the shutter is disposed between the intermediate accommodating portion and the toner conveying mechanism.

3. The image forming apparatus according to claim 1, wherein the position of the shutter is varied, relative to the intermediate accommodating portion, to the closed position when toner is supplied from the toner container to the toner supply portion, and is varied, relative to the intermediate accommodating portion, to the open position when toner is not supplied from the toner container to the toner supply portion.

4. The image forming apparatus according to claim 1, wherein at least part of the toner conveying mechanism is movable together with the developing unit relative to the main casing.

5. The image forming apparatus according to claim 1, wherein the toner supply portion further includes a lid having a position that is variable relative to the toner inlet opening, between a closed position where the lid closes the toner inlet opening, and an open position where the lid opens the toner inlet opening.

6. The image forming apparatus according to claim 1, wherein, when viewed in a moving direction, in which the developing unit is movable relative to the main casing, the toner inlet opening is disposed above both of: the developing unit; and at least part of the intermediate accommodating portion.

7. The image forming apparatus according to claim 1, comprising a plurality of the toner supply portions that are arranged in a row extending along a side of the main casing.

8. The image forming apparatus according to claim 7, wherein the plurality of the toner supply portions are arranged in a moving direction, in which the developing unit is movable relative to the main casing.

* * * * *